United States Patent Office 2,854,484
Patented Sept. 30, 1958

2,854,484

PRODUCTION OF REDUCTIC ACID

Sigmund Goldstein, Matten, near Interlaken, Bern, Switzerland

No Drawing. Application June 25, 1956
Serial No. 593,344

13 Claims. (Cl. 260—586)

The present application is a continuation-in-part of my prior application Serial No. 353,218, filed May 5, 1953, now abandoned.

The present invention relates to the production of pure crystalline reductic acid, cyclo-penten-(2)-diol-(2,3)-on-(1), having the formula

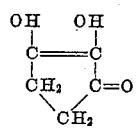

This compound has already been prepared in a crystalline form by T. Reichstein and R. Oppenauer (Helvetica chim, acta 16, 988 (1933), starting for uronic acids, polyuronic acids, pectin and pentose. For example, pectin was digested with sulfuric acid for 1½ hours at 155° C. in an autoclave. After filtration of the residue the sulfuric acid was precipitated with barium hydroxide. After filtration of the precipitate, concentrated hydrochloric acid was added to form chlorides of all cations. The water and the free hydrochloric acid was then eliminated by evaporation in a high vacuum. The residue was dissolved in absolute alcohol and respective to the alcohol a tenfold quantity of ether was added to precipitate impurities. The filtrate was evaporated in vacuo to a syrup which was dissolved in absolute alcohol. An alcoholic solution of lead acetate was then added to precipitate the reductic acid as lead salt. The precipitate was centrifuged, washed with alcohol and dispersed in water in which hydrogen sulfide was introduced. The suspension was freed from lead sulfide by filtration, the filtrate was evaporated to dryness in vacuo, and the residue was dissolved in acetone, whereupon crystals were formed. Respective to the pectin 5% of crystals were obtained.

Compared with the method described hereinafter, the method of purification applied by the above mentioned authors, which is one of the classical purifying methods of organic chemistry, must be characterized as laborious and inefficient. The yields of reductic acid were poor as compared with those obtained by the present invention, which amounted to 16.56% respective to the pectin as shown by Example III.

In several patents (Dutch Patents 56,162, April 15, 1944; 57,365, April 15, 1946; 58,279, Sept. 16, 1946), the synthesis of reductic acid has been described, starting from 2-oxycyclo-pentanone. However, this synthesis of reductic acid has never been realized on an industrial scale because it is too expensive.

Reductic acid is a substitute for ascorbic acid for all applications in industry; however, subject to the limitation that reductic acid is not a substitute for ascorbic acid used as a vitamin.

The principal object of the present invention is to provide a novel, simple and economic process for isolating reductic acid in a relative pure state from a solution thereof having impurities present resulting from the treatment of raw materials with a treatment agent.

The crude solutions may be obtained by treating material especially of plant origin as hereinafter set forth in detail containing polyuronic acid, partial methylester of polyuronic acid or a salt of polyuronic acid with a dilute aqueous solution of an inorganic or organic acid or compounds generating said acids, subsequently called "digesting acid" for several hours under pressure and at temperatures above 100° C. The thereby produced solution containing reductic acid is then treated as hereinafter described to separate the reductic acid from the impurities.

The principal steps of the present invention comprise first treating the crude solution containing reductic acid together with impurities to remove color and digesting acid. Color is removed by contact with a color adsorbing agent and the digesting acid is removed in a manner which leaves the reductic acid in solution.

The reductic acid solution is then contacted with an acidic cation exchange resin saturated with hydrogen ions, which is preferably strongly acidic and which functions to eliminate cations from the reductic acid solution. Thereafter, the cation-free reductic acid solution is contacted with a basic anion exchange resin saturated with hydroxyl ions, which is preferably strongly basic. The latter exchange resin adsorbs the reductic acid, whereas the nonionic impurities are not adsorbed and are discarded. The reductic acid is then displaced from the anion exchange resin by a displacing acid which may be inorganic or organic. After the displacing acid has been removed from the solution enriched in reductic acid, the latter is recovered in any suitable manner, but preferably by crystallization.

With certain exceptions which will be more fully discussed hereinafter, this order of succession of the single steps of the purification process of the reductic acid solution is critical; in other words, the order of succession of the single steps should be as set forth above, otherwise, the recovery of crystalline reductic acid in high purity and economic yields will be substantially prevented.

As will hereinafter more fully appear, there are many suitable adsorbing agents and the digesting acid may be removed in various ways. As will be evident, the nature and characteristics of the digesting acid will normally indicate or determine the manner of its removal. It is desired to point out that the sequence of color removal and digesting acid removal is not critical to the invention and these steps may broadly be performed in any order. As will later be more fully explained, the selection of a particular color adsorbing agent may require that one or the other of the removal operations be conducted first to achieve particularly advantageous results and specific combinations of color adsorbing agent and sequence of removal constitute a feature of the invention.

When the raw solution is decolorized and clarified by a decolorizing and clarifying medium, many of the artificial resin products which function to decolorize may be used. Further, adsorbing carbons or charcoals may be used, but with pronounced poorer results. As to the decolorizing resins, phenol-formaldehyde condensation products as well as metaphenylenediamine-formaldehyde condensation products have proven to be particularly useful. As an example, the color removal from the initial crude reductic acid solution may be effected by a commercially available product known by the trade name of Duolite S-30, which is a phenol-formaldehyde condensation product of essentially nonionic character except the very weakly acid phenolic groups which can undergo some very limited cation exchange in alkaline solutions. The metaphenylenediamine-formaldehyde condensation product known as Asmit 173 constitutes a further example of a particularly suitable decolorizing resin for the initial decolorizing operation. Further, a decolorizing step is sometimes desirable between the cation and anion exchange resin steps or immediately before crystallization of the partially decolorized and purified reductic acid, and for these decolorizing steps the above mentioned metaphenylenediamine-formaldehyde condensation product known as Asmit 173 is particularly suitable. Other decolorizing resins which may be used and which belong to the same group of condensation products of metaphenylenediamine and formaldehyde are commercially known by the trade names of Cekanol, Duolite S–35, Permutit DR and Decolorite.

The removal of the digesting acid is accomplished according to the kind of acid used. Readily volatile acids such as hydrochloric acid can be eliminated in vacuo. Non-volatile but easily precipitable acids like phosphoric, sulfuric and oxalic acid are converted to their insoluble salts, preferably calcium salts, after which the solution is separated from the precipitate and further worked up.

For the further purification of the solution containing reductic acid strongly acidic and strongly basic ion exchange resins are especially suitable. It is essential that the strongly acidic cation exchange resin be substantially saturated with hydrogen ions and that the strongly basic anion exchange resin be substantially saturated with hydroxyl ions. While any of the strong acidic cation exchange resins may be used, it is particularly desirable to use a sulfonated styrene-divinylbenzene copolymer. A sulfonated phenol-formaldehyde condensation product likewise may be used, but with poorer results. Further, while any strongly basic anion exchange resin may be employed, particularly satisfactory results are obtained by utilizing as the anion exchange resin a quaternary ammonium base of a styrene-divinylbenzene copolymer.

The strongly acidic cation exchangers consisting of sulfonated styrene-divinylbenzene copolymers are technically manufactured by copolymerization of styrene with divinylbenzene, benzoyl peroxide being employed as a catalyst, whereby a crosslinked insoluble copolymer of polystyrene is formed. This copolymer is sulfonated with hot concentrated sulfuric acid, using silver sulfate as a catalyst, whereby a high capacity nuclear sulfonic acid cation exchange resin is obtained. The strongly basic anion exchange resins consisting of a quaternary ammonium base of a styrene-divinylbenzene copolymer are technically produced by copolymerization of styrene with divinylbenzene. Into the aromatic nuclei of the thus formed crosslinked polystyrene, chloromethyl groups are introduced by chloromethylation with chloromethyl ether using Friedel-Crafts catalyst. The chloromethylated crosslinked polystyrene is treated with a tertiary amine, e. g. trimethylamine or dimethyl-hydroxyethylamine, to give a resin containing the strongly basic quaternary ammonium groups. The strongly acidic cation exchange resins on phenol-formaldehyde basis are produced by condensation of phenol-sulfonic acid with phenol and formaldehyde, whereby an insoluble resin is formed. Likewise, the phenol-formaldehyde condensation may be conducted in the presence of sodium sulfite and sodium metabisulfite.

For the purification and isolation of reductic acid in a crystalline form the three resins commercially known by the trade names of Dowex 50 (synonym: Nalcite HCR), Dowex 2 (synonym: Nalcite SAR) and Dowex 1 (synonym: Nalcite SBR) have given the best results.

Dowex 50 or Nalcite HCR is a strongly acidic cation exchange resin consisting of a sulfonated styrene-divinylbenzene copolymer containing nuclear sulfonic acid groups as the sole active cation exchange groups.

Dowex 2 or Nalcite SAR is a quaternary ammonium base of the general formula $RR'R''R'''N^+.A^-$, in which one of the R's is derived from polystyrene, which in turn has been crosslinked with divinylbenzene. Two R-groups are methyl groups and one R-group is the hydroxy-ethyl group. The resultant anion exchange resin is a highly dissociated organic base, in which the large cationic body is limited in movement and the relatively small and mobile anion is free to exchange in a wide pH-range.

Dowex 1 or Nalcite SBR is a quaternary ammonium base of the general formula $R.R'R''R'''N^+.A^-$, in which one of the R's is derived from polystyrol which has been crosslinked with divinylbenzene. Three R-groups are methyl groups.

It is to be understood that the exchange resins herein set forth while particularly satisfactory, are illustrative of the exchange resins which may be employed and, therefore, are not to be taken by way of limitation.

Other strongly acidic cation exchange resins which may be used, are sulfonated styrene-divinylbenzene copolymers, but these are perhaps somewhat less efficient. These exchange resins are known by the trade names of: Amberlite IR–120, Amberlite IR–112, Chempro C–20, Chempro C–21, Permutit Q, Zeo Karb 225, Imac C–12, Permutit RS and Duolite C–25.

Other strongly acidic cation exchange resins on phenol-formaldehyde basis which may be used, but with pronounced less efficiency are known by the following trade names: Amberlite IR–100, Amberlite IR–105, Dowex 30 or Nalcite MX, Duolite C–3, Duolite C–10, Zeo-Rex, Ionac C–200, Zero-Karb 215, Wofatite, Lewatite, Cekanol, Imac, Allassion.

Other strongly basic anion exchange resins which may be used are quaternary ammonium bases of aromatic or aliphatic matrix, e. g. copolymers, but which are perhaps somewhat slightly less efficient than the two resins mentioned above. The quaternary ammonium exchange bases are known in the trade as: Amberlite IRA–400, Amberlite IRA–410, Permutit S–1, Permutit S–2, Duolite A–40, Duolite A–41, Duolite A–42, Duolite A–43, Duolite A–44 and Duolite A–47.

Other strongly basic anion exchange resins, which at present are manufactured only in pilot plant quantities, have also given very promising results in the process of the isolation of reductic acid described here. These resins are high polymers containing tertiary sulfonium radicals and are commercially designed as Duolite ES 101 and Duolite ES 102. The former resin is a little more basic than the latter. Both resins have a capacity which is comparable with the capacity of Dowex 1 and 2. Among the tertiary sulfonium compounds those are preferred in which the sulfonium-sulfur atom bears 90–40% alkoxyaryl groups and 10–60% aryl groups and (or) aryl groups which are only substituted by alkyl groups. As an example for the synthesis of such polymers of tertiary sulfonium compounds, dry aluminum trichloride is dissolved in benzene and anisole. Dry sulfur dioxide is introduced and the mixture is heated. The tertiary sulfonium salt thus formed is isolated and condensed with paraformaldehyde, using concentrated sulfuric acid as catalyst. The resin thus formed is a strongly basic anion exchanger containing tertiary sulfonium radicals as functional groups. The tertiary sulfonium nucleus can also be prepared by the reaction of thionylchloride with anisole in the presence of aluminum trichloride, whereupon the tertiary sulfonium nuclei thus formed are crosslinked with paraformaldehyde in the presence of concentrated sulfuric acid.

Again, it is desired to emphasize that all these exchange resins are merely illustrative of the exchange resins which may be used and are not to be taken by way of limitation.

The treatment of the crude or partially purified reductic acid solution with color adsorbers, cation and anion exchange resins may be efficiently carried out by percolating the solution of the reductic acid through vertical columns of the color adsorbers or exchange resins. The ion exchangers may be utilized in the form of small spheres or granules. While naturally the size of these granules may vary, very satisfactory results have been obtained when the anion exchange resin has a size between 0.2 and 0.3 mm. or less, which means that 0.3 is the preferred upper limit and that any size therebelow may be employed and, in fact, sizes above 0.3 mm. may be employed with somewhat less efficiency.

It is desired to point out that the preferred operation of the present invention employing an anion exchange resin in which the particle size does not exceed 0.3 mm. constitutes a feature of the invention and leads to the achievement of important commercial advantage. This is quite surprising when it is considered that strongly basic anion exchange resins such as styrene-divinylbenzene copolymers, which are preferred in accordance with the invention, are most commonly available with a particle size ranging between 0.4–1 mm. When this common particle size is used, only 68–74% of the influent reductic acid can be recovered after displacement of the reductic acid from the cation exchange resin. On the other hand, the same strongly basic anion exchange resin having a particle size within the limits of 0.2 and 0.3 mm. enables the recovery of 95%–98.5% of the influent reductic acid after displacement. Thus, from a given quantity of raw material, the selection of the preferred particle size for the anion exchange resin provides an approximately 36% increase in the amount of reductic acid recovered over the amount normally recovered using the commonly available particle size. The unexpected nature and value of this preferred feature of the invention will, therefore, be evident.

As to the cation exchange resin, the maximum size is preferably 1.5 mm. and efficient results are obtained when the size of the anion exchange resin is between the limits of about 0.2 and about 1.5 mm. However, here again, the size of the anion exchange resin may be greater with some less efficient results. The point is that it is not desired to be limited to the illustrative sizes of the granules of the cation and anion exchange resins.

The statement that there has been used successfully the exchange resins set forth above in detail in a spherical or granular form, the purification of the reductic acid solutions being carried out by percolation through columns of the said resins does not exclude the use of these resins in other forms; for example, in the form of membranes, and therefore is not to be taken by way of limitation.

After the anion exchange resin has adsorbed the reductic acid, it is necessary to displace the reductic acid from the said resin and the best way to do that is by using a displacing acid. The following general requirements should be fulfilled by any of such displacing acids:

(a) They should be easily volatile or easily precipitable by a cheap precipitating agent;

(b) They should be non-posionous; and (c) They should not be too expensive or they should be of such a kind that their evaporization, or their precipitation, is not too expensive.

These requirements are met by the following displacing acids and therefore the aqueous solutions of the following volatile and precipitable acids may be used for the displacing of reductic acid from the anion exchange resin:

Volatile acids—Formic, acetic, hydrochloric and sulfurous acid.
Precipitable acids, which may preferably be precipitated as calcium salts—Oxalic, tartaric, citric, phosphoric and sulfuric acid.

Although these volatile and precipitable acids are particularly well-suited as displacing acids, it is not intended to limit the present invention to said displacing acids. For example, fatty acids with higher molecular weight than those mentioned above (propionic, butyric acid) may be used, as well as lactic acid, but with less economic efficiency.

In order to carry out efficiently the displacing of reductic acid from the anion exchange resin, the above mentioned acids should have a definite strength which is between the limiting strengths 0.04 normal and 0.3 normal. The single displacing acids should have the following strengths in order to give the best results:

|  | Normal |
| --- | --- |
| Hydrochloric acid | 0.04–0.05 |
| Sulfuric acid | 0.04–0.05 |
| Sulfurous acid | 0.07 |
| Oxalic acid | 0.07 |
| Formic acid | 0.10 |
| Orthophosphoric acid | 0.15–0.20 |
| Citric acid | 0.20 |
| Tartaric acid | 0.20 |
| Acetic acid | 0.30 |

If the strength of any of these displacing acids is substantially weaker than it should be according to the foregoing list, the displacing of the reductic acid will require too great a volume of dilute displacing acid, or displacing will be practically impossible. If, on the other hand, the strength of the displacing acid is substantially stronger than it should be according to the foregoing list, the displacing acid will not only displace the reductic acid but substantial quantities of other "strange acids" too, that is to say, anionic impurities that have been adsorbed by the anion exchange resin along with the adsorption of reductic acid. Consequently, reductic acid in a relatively pure form will not be recovered.

Excellent results have been obtained with 0.1-normal formic acid. This acid in the said concentration displaces practically selectively only reductic acid from the anion exchange resin, while anions other than reductic acid remain adsorbed on the resin. Consequently, with 0.1-normal formic acid, the purest reductic acid in the highest yield will be recovered.

The aqueous acid solution resulting from displacing the reductic acid from the anion exchange resin contains the displacing acid together with reductic acid. When the acid is a volatile acid like formic, acetic, hydrochloric and sulfurous acid, it may be driven out of that solution by evaporating the solution preferably in vacuo to small volume. When precipitatable acids like oxalic, tartaric, citric, phosphoric and sulfuric acid are employed the displacing acid may be precipitated out of the solution containing reductic acid by adding thereto a neutralizing medium or compound which then forms an insoluble salt of the displacing acid, and this insoluble precipitated salt of the displacing acid may be removed from the resulting solution containing the reductic acid by filtration, a decanting step, a centrifuging step, and the like. The reductic acid solution may then be further treated.

One manner of treating the so-obtained reductic acid solution is to evaporate the solution preferably in vacuo at temperatures not exceeding 100° C. to thereby produce a solution of relatively small volume enriched in reductic acid. The reduction of the volume is not carried so far that crystallization takes place. The solution is then filtered to remove solid components and may, but not necessarily, be treated with a color adsorber of such kind as herein set forth. This final purified solution containing reductic acid is then evaporated preferably in vacuo to such a small volume that the crystals of reductic acid of great purity separate out in high yields. These crystals of reductic acid may have a purity varying from 98.3 to 99.7%. These crude crystals may be recrystallized in a suitable crystallizing medium to obtain crystals of reductic acid of highest purity. For example, the crude crystals of 98.3% purity may be recrystallized from a mixture of ethyl acetate and ethyl alcohol, or from a mixture of dioxane and methyl alcohol.

The following substances are particularly well adapted for the production therefrom of reductic acid:

(1) Polyuronic acid and plant material containing polyuronic acid.

(2) Partial methylester of polyuronic acid and plant material containing partial methylester of polyuronic acid.

(3) Salts of polyuronic acid such as sodium-, potassium-, ammonium- and other salts and plant material containing salts of polyuronic acid.

(4) Pentose, pentosan and plant material containing pentosan.

(5) Furfural.

Specific examples of suitable starting materials are:

Material containing glucuronic acid and polyglucuronic acid: Oxidized glucose, oxidized cellulose, oxidized starch, gum arabic.

Material containing polygalacturonic acid, partial methylester of polygalacturonic or a salt of polygalacturonic acid: pectin (whose exact chemical definition is: partial methylester of polygalacturonic acid), pectic acid, sodium pectate and other pectin salts.

Material containing pectin: dried sugar beet pulp, dried apple pomace, dried pear pomace, dried citrus pulp, and dried sunflower baskets free from seeds.

Material containing polymannuronic acid or a salt of polymannuronic acid: alginic acid, sodium alginate, potassium alginate, ammonium alginate or other salts of alginic acid.

Material containing alginic acid: brown seaweeds botanically known as Phaeophyceae and exemplified by Laminaria, Fucus, Macrocystis.

Pentose, pentosan and plant material containing pentosan: arabinose, xylose, araban, xylan, straw and chaff of the cereals, legume straw, hay of grass, clover and alfalfa or other legume hay, wheat bran, cottonseed hulls, and various woods such as beech, spruce, pine, oak and maple.

It will be apparent to those skilled in the art that, for economic reasons, polyuronic acids or plants containing the same are the preferred starting materials. Alginic acid and its salts are particularly available and these materials constitute a particularly valuable starting material in accordance with the present invention.

In order to isolate reductic acid from any of the above mentioned starting materials the material is mixed with one of the following inorganic or organic acids, which is desirably, although not necessarily, a dilute aqueous solution of these acids.

Volatile acids: Hydrochloric acid
Precipitable acids: Phosphoric, sulfuric and oxalic acid.

Naturally, other volatile or precipitable acids such as the lower fatty acids, lactic acid, sulfurous acid, tartaric and citric acid may be used, but the yields of reductic acid are not so high as by using the acids mentioned above.

In order to give the highest yields of reductic acid, the above mentioned digesting acids should have a definite strength which is between the limiting strengths 5% and 15%. The strength of the highly dissociated mineral acids such as hydrochloric and sulfuric acid should be limited to 5–8%, otherwise the reductic acid, once formed, will be destroyed. The weaker acids like phosphoric and oxalic acid should have a strength of 10–15% to give optimum results. A higher condensation, for example 20% of these two last mentioned acids does not give markedly better results and too high a concentration will destroy the reductic acid. The only exception is furfural, which has to be treated with at least 50% phosphoric and oxalic acid to give a substantial yield of reductic acid. Therefore, the digesting acid should have a strength which will not destroy the reductic acid after it is once formed.

The preferred acid digesting medium is phosphoric acid since there can be recovered during the process an alkali earth metal phosphate such as calcium phosphate suitable for use as a fertilizer. In treating any of the above mentioned raw materials with an acid, the material is heated for several hours, usually for 4–5 hours, in an autoclave, at a temperature above 100° C. This temperature may broadly be between 100° and 150° C., but is preferably between 120° and 140° C. Below 120° C. the yield of reductic acid is poor or not optimal and above 140° C. the reductic acid usually is destroyed. The resulting solution contains undissolved residue and the residue may be separated therefrom by filtration, centrifuging, or the like, and the solution containing the reductic acid treated as hereinafter set forth.

It is desired, at this point, to discuss the sequence of the color removal and digesting acid removal operations. It will first be understood that different decolorizing resins are effective for the removal of color under different conditions and the pH of the crude solution being decolorized is of particular importance in this respect. It should also be appreciated that decolorization is essential prior to treatment of the crude reductic acid containing solution with the cationic and anionic exchange resins. This is because the exchange resins are spoiled by the color bodies contained in the crude digestion product. Thus, if no initial color removal is accomplished, the recovery of reductic acid is substantially prevented, and, if the initial color removal is only partly effective, the presence of substantial amounts of residual coloring matter, while perhaps not sufficient to prevent operativeness, renders the process very substantially less satisfactory. Actually, in comparison with the excellent results which can be achieved when the initial color removal is properly performed in accordance with preferred practice, it could be concluded that only partially effective treatment is operative but entirely unsatisfactory.

It has previously been indicated that the phenol-formaldehyde condensation product of essentially non-ionic character known as Duolite S–30 is a preferred decolorizing resin for the initial decolorizing operation. It has been discovered that this decolorizing resin is only fully effective when the pH of the solution decolorized is below approximately pH 3.0. Thus, since the normal digestion product, irrespective of whether the digesting acid has characteristics requiring or enabling removal by precipitation or distillation, has a pH below 3.0, the recovery process of the invention is fully operative using Duolite S–30 so long as the decolorizing operation precedes the removal of digesting acid. It should be appreciated that removal of digesting acid raises the pH of the solution so that, if a volatile acid is removed by distillation the pH may rise from pH 2 to a value above pH 3.0, e. g. pH 3.7 and the resulting recovery of reductic acid is very materially reduced, e. g. becomes unsatisfactory. On the other hand, if a precipitable acid is removed by neutralization, the pH of the solution will approximate pH 7.0 and Duolite S–30 is not operative.

Other decolorizing resins are fully effective under other conditions and the previously mentioned metaphenylenediamine-formaldehyde condensation product Asmit 173 has been found to be effective so long as the pH is below approximately pH 9.0. Thus, Asmit 173 is fully operative prior to removal of digesting acid when the ph is close to pH 2.0 and is also fully operative after removal of digesting acid. It is of interest to note that removal of digesting acid by neutralization to provide a solution having a pH of about pH 7.0 somewhat improves the color removing characteristics of Asmit 173. It has been discovered that metaphenylenediamine-formaldehyde condensation products have outstanding effectiveness in accordance with the invention when used in a solution having a pH within the range of pH 3.0–pH 4.0. Such a pH can be provided in a particularly desirable manner by digesting with a volatile acid and then distilling off said volatile acid until the desired pH is reached.

It has been discovered that the cation-free solution may, under certain circumstances, be directly purified. More specifically, when the crude reductic acid containing solution is decolorized by passing the same through a highly porous and weakly basic condensation product of an aldehyde, such as formaldehyde, with aromatic amines, such as metaphenylenediamine, it has been found that the purification operations following cation exchange treatment can be eliminated while still permitting reductic acid to be obtained in high yield and purity.

It is desired to point out that the yield and purity achieved is not fully comparable with the yields and purity which can be obtained when cation exchange treatment is followed by further purification leading to the elimination of nonionic and anionic impurities. In other words, when the cation-free solution is treated by passing the same through a strongly basic anion exchange material saturated with hydroxyl ions whereby nonionic impurities pass through and can be discarded and the absorbed mixture of anions on the resin are eluted with a weak acid of limited strength as previously set forth whereby reductic acid is selectively displaced to eliminate or substantially reduce the presence of anionic impurities, the yield, purity and desirable color characteristics of the reductic acid product are uniformly improved.

As indicated above, the weakly basic highly porous condensation product of formaldehyde with metaphenylenediamine, such as the product known by the trade name Asmit 173, has been found to be particularly suitable for the initial decolorizing operation and when decolorization is performed in this manner, the subsequent purification to eliminate nonionic and anionic impurities is no longer essential to the recovery of reductic acid. The metaphenylenediamine may be replaced by other equivalent materials. In other words, a suitable weakly basic and highly porous resin may be prepared from the condensation products of aldehydes with other aromatic amines such as metatoluidine, metaethylaminobenzene, and sym-metaxylidene.

As previously indicated, other resins of the same class as Asmit 173 are known by the trade names Cekanol, Duolite S-35, Permutit DR and Decolorite.

As previously indicated, decolorization with Asmit 173 is most efficiently performed when the solution to be decolorized has a pH within the range of approximately pH 3.0 to approximately pH 4.0. It has also been previously indicated that the desired pH for decolorization can be efficiently achieved when the digesting acid is a volatile acid by the removal of the volatile digesting acid by volatilization prior to decolorization.

The best decolorizing effect is obtained, when the darkbrown reductic acid containing solution which is free from digesting acid has a temperature of between about 50° and 75° C. The decolorizing process is best performed by percolation through a vertical column of the decolorizing resin. It has been found that a practically total removal of the coloring matter is obtained, when two or three columns of Asmit 173 are operated in succession, that is to say, the effluent from the first column is passed through the second column and so on. It is preferred that the pH of the solution to be decolorized should remain constant during the percoloration through a column of the metaphenylenediamine-formaldehyde condensation product known as Asmit 173.

To summarize, purification of the reductic acid containing solution by treatment with a stronger basic anion exchange resin followed by selective displacement can be eliminated when the digestion product is decolorized with a highly porous and weakly basic condensation product of an aldehyde with an aromatic amine and the decolorized digestion product substantially free of digesting acid is treated with a strongly acidic cation exchange resin to remove cations from the solution and to transform the salts therein into the corresponding acids. Thus, the cation-free solution can be directly crystallized to achieve reductic acid in high yield and purity. The yields and purity so obtained can be substantially further enhanced and the color characteristics of the crystalline product improved by subjecting the cation-free solution to anion exchange and selective displacement to eliminate nonionic and anionic impurities. Such further purification constitutes preferred practice of the invention and unless color removal is performed in the particularly preferred manner above set forth, the further purification of the cation-free solution to eliminate nonionic and anionic impurities is essential to the achievement of any substantial recovery of reductic acid in high purity and without employing tedious and commercially unsatisfactory procedures of the prior art such as those of Reichstein and Oppenauer referred to hereinbefore.

The present invention will be illustrated in connection with the following examples:

EXAMPLE I

*Production of reductic acid from dry sugar-beet pulp*

600 g. of dry sugar beet pulp were thoroughly mixed with 6 liters of a 10% phosphoric acid solution and were heated for four hours at 120° C. in an autoclave. After cooling the digested material was filtered and washed several times. 8.25 liters of collected filtrate contained 29.3 g. reductic acid, as determined by titration with 0.01 n iodine solution. This corresponds to a yield of 4.88% by weight taken on the dry beet pulp.

The strongly acidic and clarified, however dark brown to black colored filtrate, was subsequently passed through a column of three liters of a synthetic decolorizing resin known by the trade name of Duolite S-30, which is a phenol-formaldehyde condensation product, at a rate of 60 cc. of effluent liquid per minute. If the color adsorber is not fresh, it can be regenerated with dilute sodium hydroxide, rinsed with water, washed with dilute sulphuric acid and then washed again with water until the effluent is neutral to brom thymol blue.

The colored filtrate which contains the reductic acid has the undesired color bodies contained therein removed by passage through the said decolorizing resin which acts as a filtering medium and reductic acid will be found in the effluent. To insure complete recovery of reductic acid, the filtering medium as is customary, is washed with water, e. g. water is passed through the column of decolorising resin. Finally, 18 liters of a yellow, clarified percolate were obtained. As will be evident, some of the 18 liters if constituted by the decolorized filtrate having an initial volume of 8.25 liters and the remainder is constituted by the water washings. Preferably, the water used for washing the column is hot water having a temperature of 80° C. Also, it is preferred to discard the first portion of the effluent liquid which contains no reductic acid.

The percolate was then heated to boiling and 4.2 liters of finely powdered calcium carbonate were slowly added with stirring. When the pH of the solution had attained the value of 6.8, the solution was filtered and the precipitate was washed. The collected filtrate contained no phosphoric acid, as tested with barium chloride in the presence of ammonia.

The neutralized filtrate was then percolated at a rate of 400 cc. effluent liquid per minute through a column of 1 liter of a strongly acidic cation exchange resin saturated with hydrogen ions, which was a sulfonated styrenedivinyl-benzene copolymer commercially known by the trade name of Dowex 50 or Nalcite HCR and which was in the form of globules of a size between 0.2 and 1.5 mm. Prior to percolation, the cation resin exchanger had been regenerated with one liter of 15% hydrochloric acid and then washed with distilled water until the effluent was free of chloride. The effluent from the cation exchanger was then passed through a column of 1 liter of a strongly basic anion exchange resin in the hydroxyl form at a rate of 330 cc. of effluent liquid per minute. The anion exchange resin was a quaternary ammonium base of a styrene divinylbenzene copolymer known by the trade name of Dowex 2 or Nalcite SAR and was in the form of small globules of between 0.2 and 0.3 mm. diameter (50–70 mesh). Prior to percolation, the exchange resin was regenerated with 6 liters of 4% sodium hydroxide and then rinsed with distilled water until the effluent water had a pH of 6.5. The effluent from the anion exchanger containing nonionic material was discarded. Thereafter, 0.1-normal formic acid was passed through the anion exchanger at a rate of 170 cc. of effluent liquid per minute. By the action of 0.1-normal formic acid, reductic acid was selectively displaced from the anion exchange resin, while all adsorbed anions other than reductic acid remained adsorbed on the resin. The displaced solution was tested for reductic acid with iodine. The first and last effluent containing no or minor reductic acid concentrations were rejected.

The collected effluent from the anion exchanger amounted to 5 liters and contained more than 95% of the influent reductic acid in a concentration approximately four times stronger than the influent concentration. This effluent solution was then evaporated under the vacuum of a water pump in a Pyrex glass vacuum apparatus, immersed in a water bath maintained at 85° C. Finally a sediment of reductic acid crystals was formed. When the layer of liquid above the crystal layer had evaporated down to about 1 cm., the crystals were allowed to say for some hours in the cold and were subsequently filtered, washed with cold acetone and then dried in vacuo over calcium chloride. A first crude crystal fraction of 16.50 g. of brown colored crystals of reductic acid was obtained. Their content of pure reductic acid, as determined by titration with both iodine solution and 2,6-dichlorophenolindophenol solution was 98.25% and 98.30% respectively. Out of the mother liquor of the first crude crystal fraction a second and a third crude crystal fraction could be recovered. In the following table the yields and purities of the different crystal fractions are listed.

TABLE 1

| Crystal fraction | Yield of crude reductic acid obtained from 600 g. dry sugar beet pulp | Degree of purity of reductic acid crystals | Yield calculated as pure reductic acid | Percentage yield of pure reductic acid crystals respective to the yield of pure reductic acid immediately after acid digestion (29.3 g.) | Percentage yield of pure reductic acid crystals respective to dry sugar beet pulp |
|---|---|---|---|---|---|
|  | Grams | Percent | Grams | Percent | Percent |
| 1 | 16.50 | 98.25 | 16.21 | 55.32 | 2.70 |
| 2 | 2.00 | 97.64 | 1.95 | 6.65 | 0.32 |
| 3 | 0.37 | 97.50 | 0.36 | 1.23 | 0.06 |
| Total | 18.87 | | 18.52 | 63.20 | 3.08 |

All three crude crystal fractions had to be recrystallized merely once to yield reductic acid crystals of highest purity, that is, 100% purity, as determined by the melting point, the elementary analysis, the iodine equivalent and the alkali equivalent. Respective to the crude crystals the total yield of recrystallized fractions amounted to between 85 and 88%.

EXAMPLE II

*Production of reductic acid from dried apple pomace*

600 g. of dried apple pomace were digested with 6 liters of a 15% phosphoric acid solution for five hours at 125° C. in an antoclave. The procedure was continued according to Example I, except that the effluent from the anion exchanger, after it had been concentrated in vacuo to about 200 cc., was once more decolorized by passing through a 1 liter column of the color adsorber Asmit 173, whereupon the decolorized solution was concentrated in vacuo and further treated as indicated in Example I. The yield of crude reductic acid crystals was 10.5 g. or 1.75% respective to the dried pomace. The crystals were purer and clearer than those obtained from the dried beet pulp.

EXAMPLE III

*Production of reductic acid from pectin*

200 g. of pectin were digested with 2 liters of a 10% solution of phosphoric acid for four hours at 120° C. in an autoclave. After cooling, the dark liquid was filtered from the black residue and the residue was washed. Immediately after digestion the combined filtrate contained 41.5 g. of reductic acid, as determined by titration. The liquid was further worked up according to the procedure of Example I with the following exceptions: Only 1.5 liters of 20% suspension of calcium carbonate, 1 liter of color adsorber (Duolite S-30), 300 cc. of cation exchanger (Dowex 2, 50-70 mesh) were used. The following yields of crude crystals were obtained:

TABLE 2

| Crystal fraction | Yield of crude reductic acid obtained from 200 g. pectin | Degree of purity of reductic acid crystals | Yield calculated as pure reductic acid | Percentage yield of pure reductic acid crystals respective to the yield of pure reductic acid immediately after acid digestion (41.52 g.) | Percentage yield of pure reductic acid crystals respective to the pectin |
|---|---|---|---|---|---|
|  | Grams | Percent | Grams | Percent | Percent |
| 1 | 29.87 | 99.60 | 29.75 | 71.65 | 14.87 |
| 2 | 2.56 | 99.40 | 2.54 | 6.12 | 1.27 |
| 3 | 0.86 | 99.40 | 0.85 | 2.05 | 0.42 |
| Total | 33.29 | | 33.14 | 79.82 | 16.56 |

The crystals were of a beautiful yellowish appearance.

EXAMPLE IV

*Production of reductic acid from brown seaweed*

600 g. of dry, ground, brown seaweeds of the species Laminaria were digested with 6 liters of a 10% solution of phosphoric acid for five hours at 135° C. in an autoclave. The digested material was filtered, the residue was washed and filtered twice. The collected filtrate contained 33.9 g. reductic acid as determined by titration. The decolorization was carried out using 3 liters of the artifical resin color adsorber Duolite S-30, the neutralization using 4 liters of a boiling 20% suspension of calcium carbonate. After percolation through 1 liter of the cation exchanger Dowex 50, 750 cc. of a 0.2 n barium hydroxide solution were required in order to eliminate the sulfate present. After percolation through 1.5 liters of the anion exchanger Dowex 2, 50–70 mesh and after selective displacement with 0.1-normal formic acid, the purified liquid enriched in reductic acid was evaporated in vacuo to approximately 200 cc., filtered and once more decolorized with 1 liter of the color adsorber Asmit 173. Thereupon the liquid, the volume of which had grown larger, was again concentrated in vacuo to approximately 300 cc., filtered and concentrated to a very small volume, whereupon a first crude crystal fraction of 15.25 g. of yellowish crystals were obtained. The total yield is listed in the following Table 3.

TABLE 3

| Crystal fraction | Yield of crude reductic acid obtained from 600 g. dry brown seaweeds | Degree of purity of reductic acid crystals | Yield calculated as pure reductic acid | Percentage yield of pure reductic acid crystals respective to the yield of pure reductic acid immediately after acid digestion (33.9 g.) | Percentage yield of pure reductic acid crystals respective to the dry brown seaweeds |
|---|---|---|---|---|---|
| | Grams | Percent | Grams | Percent | Percent |
| 1 | 15.25 | 99.55 | 15.18 | 44.78 | 2.53 |
| 2 | 1.80 | 99.00 | 1.78 | 5.25 | 0.30 |
| 3 | 0.51 | 98.72 | 0.50 | 1.47 | 0.08 |
| Total | 17.56 | | 17.46 | 51.50 | 2.91 |

EXAMPLE V

*Production of reductic acid from alginic acid*

200 g. of alginic acid were digested with two liters of a 10% solution of phosphoric acid for five hours at 135° C. in an autoclave. After cooling, the digested alginic acid was filtered. The dark residue was then soaked in water and again filtered. This was repeated. The combined filtrate contained 38.07 g. of reductic acid, as determined by titration. The liquid was further treated according to the procedure of Example I, subject to the following variations:

1200 cc. of 20% suspension of calcium carbonate, 1 liter of color adsorber Duolite S–30, 300 cc. of cation exchanger Dowex 50, and 500 cc. of anion exchanger Dowex 2, 50–70 mesh, were required. The following yields of crude crystals were obtained:

TABLE 4

| Crystal fraction | Yield of crude reductic acid obtained from 200 g. alginic acid | Degree of purity of reductic acid crystals | Yield calculated as pure reductic acid | Percentage yield of pure reductic acid crystals respective to the yield of pure reductic acid immediately after acid digestion (38.07 g.) | Percentage yield of pure reductic acid crystals respective to the alginic acid |
|---|---|---|---|---|---|
| | Grams | Percent | Grams | Percent | Percent |
| 1 | 27.24 | 99.24 | 27.03 | 71.00 | 13.51 |
| 2 | 2.98 | 99.18 | 2.95 | 7.75 | 1.47 |
| 3 | 0.35 | 98.40 | 0.34 | 0.90 | 0.17 |
| Total | 30.57 | | 30.32 | 79.65 | 15.15 |

The crystals were of a beautiful yellowish appearance. Experiments carried out with sodium alginates resulted in similar high yields of reductic acid as those just reported.

EXAMPLE VI

*Production of reductic acid from furfural*

600 g. of furfural were digested with six liters of a 50% solution of phosphoric acid for one and one-half hours at 150° C. in an autoclave. The digested material was filtered and the dark residual polymerisate was repeatedly soaked in water, pressed and filtered. The combined filtrate was then worked up according to Example I, with the exception that more suspension of calcium carbonate was needed in order to remove the phosphoric acid. Respective to the furfural 2.18% of crude reductic acid crystals of 98.3 to 99.5% purity were recovered.

EXAMPLE VII

*Production of reductic acid from alginic acid using hydrochloric acid as the digesting acid and a metaphenylenediamineformaldehyde condensation product for the removal of color*

(a) *With anion exchange.*—1200 g. of dry ground alginic acid of a technical grade quality, having a uronic acid content of 76.3% and 14.9% water were mixed with 5 liters of a 6.5 wt. percent solution of aqueous hydrochloric acid and were heated for 4 hours at 135° C. in an autoclave. The digested material was filtered, the residue was washed with hot water and again filtered. After several washings and filtrations the collected dark-brown filtrate amounted to 12.5 liters and contained 142.4 g. of reductic acid, corresponding to a percentage yield respective to the alginic acid of 11.87%. The filtrate was then evaporated under the vacuum of a water pump in a Pyrex glass vacuum apparatus immersed in a water bath kept at 85° C. When the dark-brown filtrate had been evaporated down to approximately 300 cc., 12 liters of deionized water were sucked in 60 subsequent portions of 200 cc. and in short time intervals into the vacuum apparatus, so practically all of the hydrochloric acid could be distilled away from the dark-brown liquid. (It is also possible to remove all of the hydrochloric acid by evaporating to dryness under the vacuum of a water pump and then applying a high vacuum for several hours.) The black-brown residual liquid in the vacuum apparatus had a pH of 3.1. This liquid was next filtered, diluted to 5 liters heated to 80° C. and passed through a column of three liters of a synthetic decolorizing resin, a highly porous metaphenylene-diamine-formaldehyde condensation product known by the trade name of Asmit 173, at a speed of about 0.5 volume of colored solution per volume of resin per hour, corresponding to about 25 cc. of effluent per minute. The column of the resin had, immediately before percolating the colored solution, been preheated to about 70° C. by percolating hot water of 80° C. through it.

The first liters of the effluent from the decolorizer were strongly yellow, but as later on the color of the effluent become weakly yellowish, the percolation was speeded up to 3 volumes of liquid per volume of resin per hour corresponding to 150 cc. of effluent per minute. The resin was washed with hot water at 80° C. to insure complete recovery of the reductic acid in the effluent. Almost all of the coloring matter remained adsorbed on the resin. Finally, 18 liters of collected weakly yellow effluent were obtained.

The essentially color-free effluent was next percolated at a rate of 200 cc. of effluent solution per minute through a column of 700 cc. of a strongly acidic cation exchange resin saturated with hydrogen ions. The cation exchange resin was a sulfonated styrene-divinylbenzene copolymer in the form of globules of between 0.2–1.5 mm. diameter, commercially known by the trade name of Dowex 50 or Nalcite HCR. The effluent from the cation exchanger was then passed through a column of 2.5 liters of a strongly basic anion exchange resin saturated with hydroxyl ions, at a rate of 200 cc. of effluent per minute. The anion exchanger had the form of small globules of a diameter between 0.2 and 0.3 mm. It was a quaternary ammonium base of a styrene-divinylbenzene copolymer of high basicity, known by the trade name of Dowex 1 or Nalcite SBR.

The effluent from the anion exchanger containing non-ionic material was discarded. Thereafter, 0.1-normal formic acid was passed through the anion exchanger at a speed of about 200 cc. per minute. By the action of 0.1-normal formic acid, reductic acid was selectively displaced from the anion exchange resin, while all adsorbed anions other than reductic acid remained adsorbed on the resin. The displaced solution was tested for reductic acid with iodine. The first and the last effluent containing no or minor reductic acid concentrations were rejected. 16 liters of effluent were collected. These were then evaporated under the vacuum of a water pump in a Pyrex glass apparatus immersed in a water bath kept at 85° C. Finally, a sediment of reductic acid crystals was formed. When the layer of liquid above the crystal layer was only about 1 cm., the evaporation was terminated, the crystals were allowed to stay in the mother liquor in the cold for 2 hours and were then filtered, washed with cold acetone and dried in vacuo over calcium chloride and then over phosphorous pentoxide. A first crystal fraction of 103.8 g. of yellowish-white crystals was obtained. The purity of these crystals was 99.36%, as determined by titration with both iodine and 2,6-dichlorophenol-indophenol. By concentrating the mother liquor of the first crystal fraction, a second crystal fraction of 6.6 g. of 98.84% purity was obtained. In the following table the absolute and percentage yields of reductic acid are listed:

TABLE 5

| Crystal fraction | Yield of reductic acid obtained from 1,200 g. of alginic acid | Purity of reductic acid crystals | Percentage yield of pure reductic acid crystals respective to the yield of reductic acid determined by titration immediately after acid digestion (142.4 g.) | Percentage yield of pure reductic acid crystals respective to alginic acid |
| --- | --- | --- | --- | --- |
| | Grams | Percent | Percent | Percent |
| 1 | 103.8 | 99.36 | 72.42 | 8.59 |
| 2 | 6.6 | 98.84 | 4.58 | 0.54 |
| Total | 110.4 | | 77.00 | 9.13 |

(b) *Without anion exchange.*—Example VIIa was repeated, with the exception that the effluent from the cation exchanger, instead of being submitted to an anion exchange treatment, was directly evaporated in vacuo, the following yield was obtained:

| Crystal fraction | Yield of crude reductic acid obtained from 1,200 g. alginic acid | Degree of purity of reductic acid crystals | Yield calculated as pure reductic acid | Percentage yield of pure reductic acid crystals respective to the yield of pure reductic acid immediately after acid digestion (142.4 g.) | Percentage yield of pure reductic acid crystals respective to the alginic acid |
| --- | --- | --- | --- | --- | --- |
| | G. | Percent | G. | Percent | Percent |
| 1 | 90.6 | 98.8 | 89.51 | 62.9 | 7.46 |
| 2 | (¹) | (¹) | (¹) | (¹) | (¹) |

¹ Not recoverable.

EXAMPLE VIII

*Production of reductic acid from alginic acid*

(a) *With anion exchange.*—1200 g. of alginic acid having an uronic acid content of 76.3% and a water content of 14.9% corresponding to an uronic acid content of 89.7% in the water-free substance were digested with 4.5 liters of a 10% solution of phosphoric acid for five hours at 135° C. in an autoclave. The digested matter was filtered, the residue soaked in water and again filtered. This was repeated 6 times. The combined filtrate contained 198.4 g. of reductic acid, as determined by titration. This filtrate was neutralized with 4.3 liters of a 20% suspension of calcium carbonate. The precipitate was removed by filtration and washed and the washings added to the filtrate. The dark brown filtrate was subsequently heated to 75° C. and percolated at low speed through a column of 2 liters of a decolorizing resin which is a metaphenylene-diamine-formaldehyde condensation product known as Asmit 173. The collected effluent from this column was heated to about 75° C. and again percolated through a second 2-liter column of the same decolorizing resin. The essentially decolorized effluent was subsequently passed through a column of 1.5 liters of the strongly acidic cation exchange resin Dowex 50, which was in the hydrogen form and the effluent from this cation exchange resin was passed through a column of 3.5 liters of the strongly basic anion exchange resin Dowex 1, which was essentially saturated with hydroxyl ions. Subsequently the adsorbed reductic acid was displaced from the anion exchange resin by 0.1-normal formic acid. The effluent from the anion exchange resin containing reductic acid was then concentrated in vacuo. The following yields of reductic acid were obtained:

| Crystal fraction | Yield of crude reductic acid obtained from 1,200 g. alginic acid | Degree of purity of reductic acid crystals | Yield calculated as pure reductic acid | Percentage yield of pure reductic acid crystals respective to the yield of pure reductic acid immediately after acid digestion (198.4 g.) | Percentage yield of pure reductic acid crystals respective to the alginic acid |
|---|---|---|---|---|---|
| | G. | Percent | G. | Percent | Percent |
| 1 | 153.4 | 99.74 | 153.0 | 77.1 | 12.75 |
| 2 | 5.8 | 96.70 | 5.6 | 2.8 | 0.47 |
| Total | 159.2 | | 158.6 | 79.9 | 13.22 |

(b) *Without anion exchange.*—The identical procedure was followed as in Example VIIIa, but instead of submitting the effluent from the cation exchange resin to an anion exchange treatment, it was directly concentrated in vacuo. The yield was as follows:

| Crystal fraction | Yield of crude reductic acid obtained from 1,200 g. alginic acid | Degree of purity of reductic acid crystals | Yield calculated as pure reductic acid | Percentage yield of pure reductic acid crystals respective to the yield of pure reductic acid immediately after acid digestion (198.4 g.) | Percentage yield of pure reductic acid crystals respective to the alginic acid |
|---|---|---|---|---|---|
| | G. | Percent | G. | Percent | Percent |
| 1 | 135.3 | 99.2 | 134.2 | 67.6 | 11.27 |
| 2 | (¹) | (¹) | (¹) | (¹) | (¹) |

¹ Not recoverable.

I claim:

1. The process of recovering relatively pure crystalline reductic acid from a crude aqueous solution produced by the digestion of polyuronic acid containing raw material with a dilute aqueous acid solution which comprises, removing color bodies and digesting acid from the crude aqueous solution resulting from said digestion, said removal of said color bodies being effected by passing the solution through a synthetic decolorizing resin, then passing the crude solution of reductic acid free of digesting acid through a strongly acidic cation exchange resin saturated with hydrogen ions to eliminate cations from the reductic acid solution, passing the cation-free reductic acid solution through a strongly basic anion exchange resin saturated with hydroxyl ions to adsorb the reductic acid together with other acids while permitting nonionic impurities to pass through, selectively displacing the reductic acid from the said anion exchange resin without simultaneously removing the other acids adsorbed thereon by treating said anion exchange resin with a displacing acid having a strength between the limits of about 0.04 normal and 0.3 normal and recovering crystalline reductic acid of high purity from the solution so produced by removing the water and displacing acid present.

2. The process defined in claim 1 in which said digesting acid is precipitable by converting said acid into an insoluble salt, the corresponding salt of reductic acid being soluble, and said digesting acid is precipitated by converting it into the said insoluble salt and said salt is removed by filtration.

3. The process defined in claim 1 in which said digesting acid is volatile and is removed by distillation under vacuum.

4. The process defined in claim 1 in which said synthetic decolorizing resin is a highly porous and weakly basic condensation product of an aldehyde with an aromatic amine.

5. The process defined in claim 4 in which said resin is a metaphenylenediamine-formaldehyde condensation product.

6. The process of recovering relatively pure crystalline reductic acid from a crude aqueous solution containing reductic acid together with substantial quantities of coloring matter and large amounts of ionic and nonionic impurities which are difficult to separate from reductic acid comprising removing said color bodies from said crude aqueous solution to substantially decolorize the same by passing the solution through a synthetic decolorizing resin, passing said substantially decolorized solution through a strongly acidic cation exchange resin saturated with hydrogen ions to eliminate cations from the reductic acid solution, passing the cation-free reductic acid solution through a strongly basic anion exchange resin saturated with hydroxyl ions to adsorb the reductic acid together with other acids while permitting nonionic impurities to pass through, selectively displacing the reductic acid from the said anion exchange resin without simultaneously removing the other acids adsorbed thereon by treating said anion exchange resin with a displacing acid having a strength between the limits of about 0.04 normal and 0.3 normal and recovering crystalline reductic acid of high purity from the solution so produced by removing the water and displacing acid present.

7. The process defined in claim 6 in which the strongly acidic cation exchange resin is a sulfonated styrene-divinylbenzene copolymer.

8. The process defined in claim 6 in which the strongly basic anion exchange resin is a quaternary ammonium base of a styrene-divinylbenzene copolymer.

9. The process of recovering relatively pure crystalline reductic acid from the crude aqueous solution containing reductic acid produced by the acid digestion of polyuronic acid containing materials with phosphoric acid which comprises, removing color bodies and phosphoric acid from said crude aqueous solution, said removal of said color bodies being effected by passing the solution through a synthetic decolorizing resin, said removal of phosphoric acid being effected by precipitating the phosphoric acid as the calcium salt and removing the precipitate by filtration, passing the so-treated solution through a strongly acidic cation exchange resin saturated with hydrogen ions to eliminate cations from the reductic acid solution, passing the cation-free reductic acid solution through a strongly basic anion exchange resin saturated with hydroxyl ions to adsorb the reductic acid together with other acids while permitting the nonionic impurities to pass through, selectively displacing the reductic acid from the said anion exchange resin without simultaneously removing the other acids adsorbed thereon by treating said anion exchange resin with a 0.1 normal solution of formic acid and recovering from the solution so produced crystalline reductic acid of high purity by distilling the solution so produced to a very small volume under vacuum to thereby remove the water and the formic acid present.

10. The process for the purification of impure aqueous solutions produced by the digestion of polyuronic acid containing materials with an aqueous acid solution to separate the reductic acid contained in said crude solutions from the color bodies and organic and inorganic ionic and non-ionic impurities which are also contained therein comprising substantially removing said color bodies and said digesting acid from said impure solution, eliminating cations from said substantially decolorized and digesting acid-free solution, passing the cation-free reductic acid solution through a strongly basic anion exchange resin saturated with hydroxyl ions to adsorb the reductic acid together with other acids while permitting non-ionic impurities to pass through and contacting said anion exchange resin with a displacing acid having a strength sufficient to selectively displace the reductic acid from the said anion exchange resin without simultaneously removing the other acids adsorbed thereon.

11. The process of recovering relatively pure crystalline reductic acid from a crude aqueous solution produced by the digestion of polyuronic acid containing raw material with a dilute aqueous acid solution which comprises removing color bodies and digesting acid from the crude aqueous solution resulting from said digestion, said removal of said color bodies being effected by passing the solution through a highly porous weakly basic condensation product of an aldehyde with an aromatic amine, then passing the crude decolorized solution of reductic acid free of digesting acid through a strongly acidic cation exchange resin saturated with hydrogen ions to eliminate cations from the reductic acid solution, and crystallizing said reductic acid solution.

12. The process defined in claim 11 in which said decolorizing resin is a condensation product of metaphenylenediamine with formaldehyde.

13. In the process of recovering relatively pure crystalline reductic acid from a crude aqueous solution produced by the digestion of polyuronic acid containing raw material with a dilute aqueous acid solution, the improvement which comprises substantially completely removing color bodies and digesting acid from the crude aqueous solution resulting from said digestion, said removal of said color bodies being effected by passing the solution through a synthetic decolorizing resin, which is a condensation product of an aromatic amine with an aldehyde, and then passing the crude solution of reductic acid free of digesting acid through a strongly acidic cation exchange resin saturated with hydrogen ions to eliminate cations from the reductic acid solution.

References Cited in the file of this patent
UNITED STATES PATENTS 2,443,583    Mottern et al. _____ June 15, 1948